No. 781,883. Patented February 7, 1905.

UNITED STATES PATENT OFFICE.

JOSEPH ROSS HUNTER, OF PHILADELPHIA, PENNSYLVANIA, ASSIGNOR TO WILLIAM HINCKLE SMITH, OF PHILADELPHIA, PENNSYLVANIA.

PROCESS OF TREATING BONE.

SPECIFICATION forming part of Letters Patent No. 781,883, dated February 7, 1905.

Application filed December 22, 1904. Serial No. 238,003.

*To all whom it may concern:*

Be it known that I, JOSEPH ROSS HUNTER, a citizen of the United States, residing in the city and county of Philadelphia, State of Pennsylvania, have invented a new and useful Process of Treating Bone, of which the following is a specification.

In carrying out my invention I treat bone of any kind to remove mineral matter therefrom, particularly phosphate of calcium. I preferably also remove fatty matter and moisture from the bone. These latter may be done preliminarily or at the same time as the removal of mineral matter. I preferably wash the bone to remove foreign matter and cut it up to make it more convenient for handling and to make all parts more easily accessible to the treatment herein. I thus place it in vessels containing a solution of acid which will combine with the calcium to form compounds soluble in water. The percentage of acid used is preferably relatively small, being about twenty per cent., but varies slightly according to the acid, the character of the bone, whether fresh or dead, and the temperature at which the process is to be carried out. The extent of action of acid upon the mineral salts relatively to the action upon the fiber of the bone which I wish to retain depends upon the temperature. The most suitable temperature in the case of hydrochloric acid is in the vicinity of blood-heat. The fiber remaining from the acid treatment, ordinarily termed "ossein," is then washed thoroughly and the acid removed by churning or working in the water or in a solution of sal-soda. Any objectionable color of the fiber may be removed by bleaching with peroxid of hydrogen. The ossein is preferably kept wet until the process is complete, but may be moistened if it dry too much. From the soda-washing or from the bleaching process the bone is put into a beating-engine and thoroughly beaten. This breaks the fiber up somewhat; but I preferably complete the division in a refining or Jordan engine to the fineness required for the desired purpose.

It will be evident that various changes may be made by those skilled in the art which will come within the scope of my invention, and I do not, therefore, desire to be limited in every instance to the exact process herein shown and described.

Having thus described my invention, what I claim as new, and desire to secure by Letters Patent, is—

1. The process of producing shreds from bone, lacking mineral matter thereof, which consists in treating the bone with acid to remove mineral matter and in fracturing the residuum while wet.

2. The process of producing delimed shreds from bone which consists in washing bone, in cutting it up into convenient sizes, in treating it with acid at approximately blood-heat, reducing its acidity and finely dividing the product.

3. In the method of producing ossein, the treatment of the bone with acid approximately at blood-heat.

4. The process of producing delimed shreds from bone, which consists in treating bone with acid at approximately blood-heat, eliminating the acidity thereof and finely dividing the product.

JOSEPH ROSS HUNTER.

Witnesses:
JOHN A. WIEDERSHEIM,
WM. CANER WIEDERSHEIM.